United States Patent
Hendrickx et al.

(10) Patent No.: US 11,657,161 B2
(45) Date of Patent: May 23, 2023

(54) CORRELATION BETWEEN SOURCE CODE REPOSITORIES AND WEB ENDPOINTS

(71) Applicant: MICROSOFT TECHNOLOGY LICENSING, LLC., Redmond, WA (US)

(72) Inventors: Michael Hendrickx, Bellevue, WA (US); Safwan Mahmud Khan, Woodinville, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 192 days.

(21) Appl. No.: 17/131,540

(22) Filed: Dec. 22, 2020

(65) Prior Publication Data

US 2022/0198024 A1  Jun. 23, 2022

(51) Int. Cl.
*G06F 21/57* (2013.01)
*G06F 8/70* (2018.01)
*G06F 21/51* (2013.01)
*H04L 9/40* (2022.01)

(52) U.S. Cl.
CPC .............. *G06F 21/577* (2013.01); *G06F 8/70* (2013.01); *G06F 21/51* (2013.01); *H04L 63/1433* (2013.01)

(58) Field of Classification Search
CPC .... G06F 21/128; G06F 21/445; G06F 21/577; H04L 63/1433
See application file for complete search history.

(56) References Cited

U.S. PATENT DOCUMENTS

| | | | | |
|---|---|---|---|---|
| 6,269,153 B1* | 7/2001 | Carpenter | ............. | H04M 1/645 704/9 |
| 9,390,268 B1* | 7/2016 | Martini | ............... | H04L 63/1433 |
| 10,484,419 B1* | 11/2019 | Davis | .................... | G06F 21/564 |
| 11,537,400 B1* | 12/2022 | Zhang | .................. | G06F 9/3005 |
| 2005/0108325 A1* | 5/2005 | Ponte | ..................... | G06F 16/95 707/E17.107 |
| 2005/0283834 A1* | 12/2005 | Hall | ...................... | G06F 21/577 713/188 |
| 2007/0234304 A1* | 10/2007 | Berg | ................... | G06F 11/3604 717/126 |

(Continued)

FOREIGN PATENT DOCUMENTS

CN   109657208 A   4/2019

OTHER PUBLICATIONS

"Displaying a NuGet package's dependencies" Jan. 17, 2017, retrieved form Internet Archive Wayback Machine < https://web.archive.org/web/20170117064436/https://stackoverflow.com/questions/9037745/displaying-a-nuget-packages-dependencies > on Aug. 27, 2022 (Year: 2017).*

(Continued)

*Primary Examiner* — Eric W Shepperd (57) ABSTRACT

An automated tool analyzes source code repositories and web endpoints for unique characteristics that they both share in order to predict the likelihood that a particular source code repository contains source code files used in a web endpoint and to predict the likelihood that a web endpoint uses source code files of a particular repository. The unique characteristics are referred to as fingerprints and include unique combination of public-facing entities, unique tokens, and unique DOM characteristics.

20 Claims, 7 Drawing Sheets

(56) References Cited

U.S. PATENT DOCUMENTS

| | | | |
|---|---|---|---|
| 2008/0098360 A1* | 4/2008 | Klinger | G06F 8/70 717/128 |
| 2011/0283270 A1* | 11/2011 | Gass | G06F 8/65 717/168 |
| 2012/0180024 A1* | 7/2012 | Gonzalez | G06F 8/71 717/109 |
| 2013/0160131 A1* | 6/2013 | Madou | H04L 63/1433 726/25 |
| 2014/0281535 A1* | 9/2014 | Kane | G06F 21/6209 713/168 |
| 2015/0302198 A1* | 10/2015 | Payne | G06F 21/562 726/23 |
| 2017/0147810 A1* | 5/2017 | Richardson | H04W 12/128 |
| 2018/0074818 A1* | 3/2018 | Carmack | G06F 8/73 |
| 2018/0157842 A1* | 6/2018 | Holz | G06F 16/338 |
| 2018/0191764 A1* | 7/2018 | Chawla | G06F 16/951 |
| 2019/0007444 A1* | 1/2019 | Shekyan | G06F 21/56 |
| 2020/0142674 A1* | 5/2020 | Hernan | G06F 9/541 |
| 2020/0153850 A1* | 5/2020 | Krishnan | H04L 63/101 |
| 2020/0218535 A1* | 7/2020 | Alomari | G06F 8/425 |
| 2021/0124575 A1* | 4/2021 | Bell, IV | G06F 16/152 |
| 2021/0173926 A1* | 6/2021 | Slipenchuk | G06F 21/566 |
| 2021/0319026 A1* | 10/2021 | Seth | G06N 20/20 |

OTHER PUBLICATIONS

"International Search Report and Written Opinion Issued in PCT Application No. PCT/US21/060908", dated Mar. 17, 2022, 10 Pages.

Urbanadventurer, et al., "WhatWeb", Retrieved From: https://github.com/urbanadventurer/WhatWeb, Oct. 1, 2020, 15 Pages.

"DOMParser", Retrieved From: https://web.archive.org/web/20200814230001/https://developer.mozilla.org/en-US/docs/Web/API/DDOMParser, Aug. 14, 2020, 12 Pages.

"Site2: Go Beyond Compliance" Retrieved From: https://web.archive.org/web/20200607083610/https://www.site2.com/. Jun. 7, 2020, 3 Pages.

* cited by examiner

CORRELATION BETWEEN SOURCE CODE REPOSITORIES AND WEB ENDPOINTS

BACKGROUND

Software development tools, such as an integrated development environment, often utilize a project to store a collection of related files that are compiled into an executable, library, web page, or web application. The project may include source code files, icons, images, data files, scripts that are used to build, edit, and debug code. The project may be stored in a source code repository that is shared by multiple developers.

A web service is an application that is accessible over the Internet through a standard web protocol (e.g., HyperText Transfer Protocol (HTTP/Hypertext Transfer Protocol Secure (HTTPS)) which uses a standard messaging system for communications with other Internet-connected devices. A web service exposes one or more web endpoints where messages are sent. The web endpoint is where files or active server pages are exposed (e.g., JavaScript files, Javascript Object Notation (JSON) files, Hypertext Markup Language (HTML) web pages, etc.).

At times, a security vulnerability may be traced to a web endpoint or to a source code file used in a web endpoint. To analyze the issue further, the identity of the source code files of the web endpoint or the identity of the web endpoints that utilize a particular source code file is needed to remedy the vulnerability. However, the location of the source code files used in a web endpoint or the identity of the web endpoints that utilize particular source code files may not be known. Often, there is no mechanism that correlates a web endpoint with the source code repository that stores the source code files exposed by the web endpoint or the web endpoints that utilize a particular source code file.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An automated tool is disclosed that analyzes source code repositories and web endpoints for unique characteristics that they both share in order to predict the likelihood that a particular source code repository contains source code files used in a web endpoint and to predict the likelihood that a web endpoint uses source code files of a particular repository. The unique characteristics are referred to as fingerprints and include unique combinations of public-facing entities, unique tokens, and unique Document Object Model (DOM) characteristics.

The unique characteristics are discovered using a static analysis component and a dynamic analysis component. The static analysis component scans the static version of source code files stored in a project of a source code repository and the dynamic analysis component scans the rendered versions found at the web endpoint and other content data of the web endpoint.

A correlation coefficient is computed for a source code repository and web endpoint pair which indicates the degree of similarity between the source code repository and the web endpoint based on the fingerprints of each partner of the pair. A high degree of similarity indicates a strong likelihood that the source code repository and the web endpoint are related.

The automated tool may be part of a security service that uses the correlation between source code repositories and web endpoints to detect the origin of a security vulnerability that may surface in a web endpoint or in a source code repository. The identification of the related web endpoint or source code repository improves the response time of the security service in remedying the security vulnerability.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Overview

The subject matter disclosed pertains to a mechanism that predicts the relationship between a static source code repository of a web application and its compiled and published version that is publicly-accessible on a web endpoint.

Software companies utilize tens of thousands of source code projects that are spread across multiple repositories and used in several web endpoints. Cataloguing a source code repository with the location of the web endpoints that utilize the source code files of a project within a repository and/or the source code repositories that store files used in a web endpoint is a challenging effort that is prone to human errors and is often outdated.

An automated tool is disclosed that analyzes source code repositories and web endpoints for unique characteristics that they both share in order to predict the likelihood that a particular source code repository contains source code files used in a web endpoint and to predict the likelihood that a web endpoint uses source code files of a particular repository. The unique characteristics are referred to as fingerprints and include unique combinations of public-facing entities, unique tokens, and unique DOM characteristics.

A public-facing entity is a library that contains source code that may be found in code used by a web endpoint. There are many widely-popular libraries but the existence of an individual public-facing entity is not unique enough. The combination of the public-facing entities found in a repository and web endpoint is a unique characteristic that is used as a fingerprint.

Tokens are static values or attribute-value pairs found in a source code file of a repository or web endpoint. DOM characteristics are attribute-value pairs found in the DOM of a rendered web page.

The unique characteristics are discovered using a static scanning process performed by a static analysis component and a dynamic scanning process performed by a dynamic analysis component. The static analysis component scans the static version of source code files stored in a project of a source code repository and the dynamic analysis component scans the rendered versions of these files and other content found at the web endpoint.

A correlation coefficient is computed for a source code repository and web endpoint pair which indicates the degree of similarity between the source code repository and the web endpoint based on the fingerprints found in each part of the pair. A high degree of similarity indicates a strong likelihood that the source code repository and the web endpoint are related.

The correlation or association between the source code repository and its use in a web endpoint may be used in different scenarios. The correlation aids in finding the source of a security vulnerability that may be hidden in a web endpoint or in related source code files stored in a source code repository. When a security vulnerability is found in an endpoint, knowledge of the origin of the security issue is crucial to resolving the issue and this requires knowing where the source code files of the web endpoint are located. Likewise, when a security vulnerability is found in source code file of a source code repository, knowledge of the web endpoints that utilize the faulty source code file is crucial to resolving the vulnerability.

Attention now turns to a further discussion of the system, devices, components, and methods utilized in the discovery of the correlation between source code repositories and web endpoints.

System

Figure 1A:
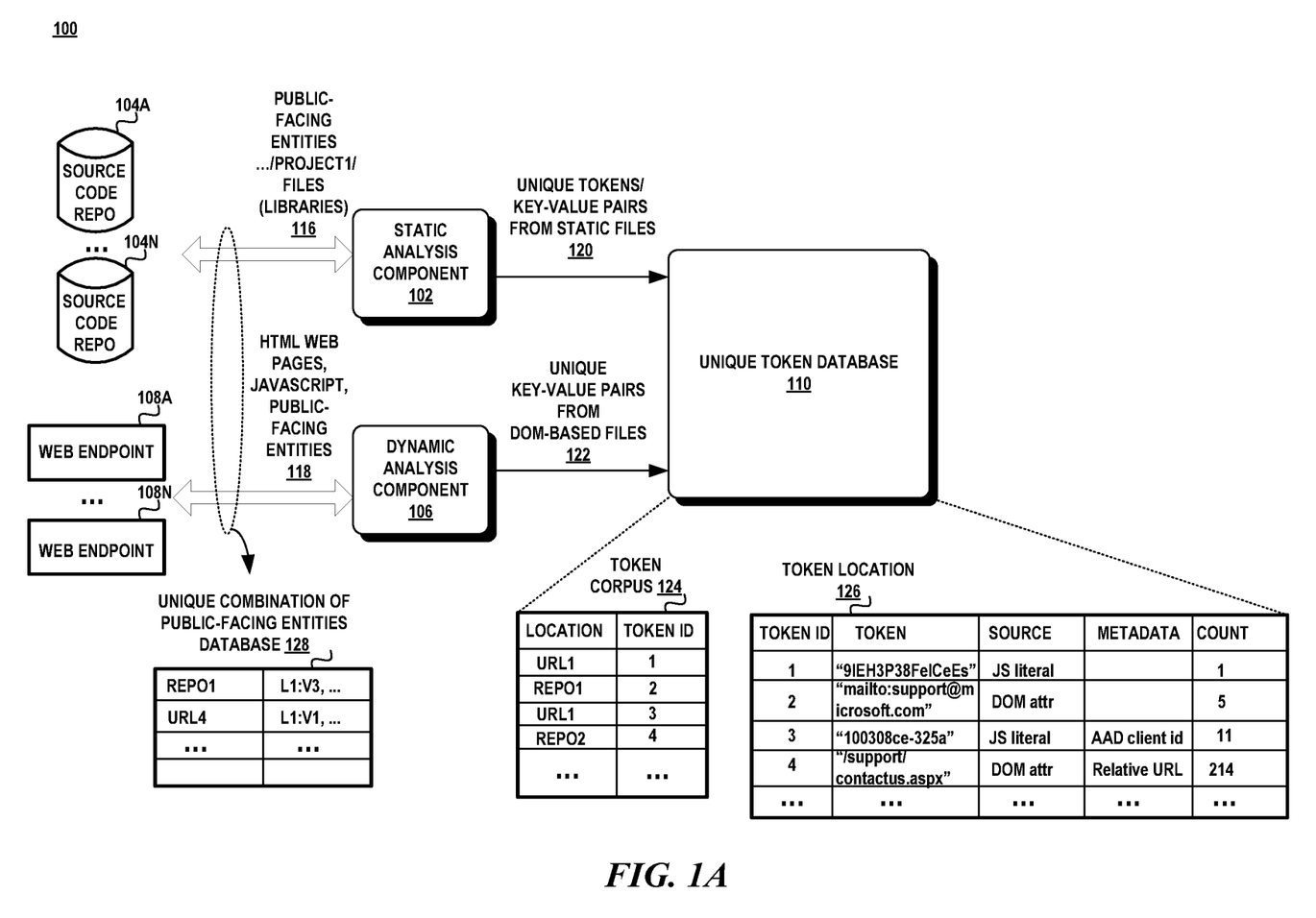
FIGS. 1A-1B are block diagrams illustrating an exemplary system for detecting fingerprints from source code repositories and web endpoints which are used to generate correlation coefficients predicting the relationship between a source code repository and a web endpoint.
Figure 1B:
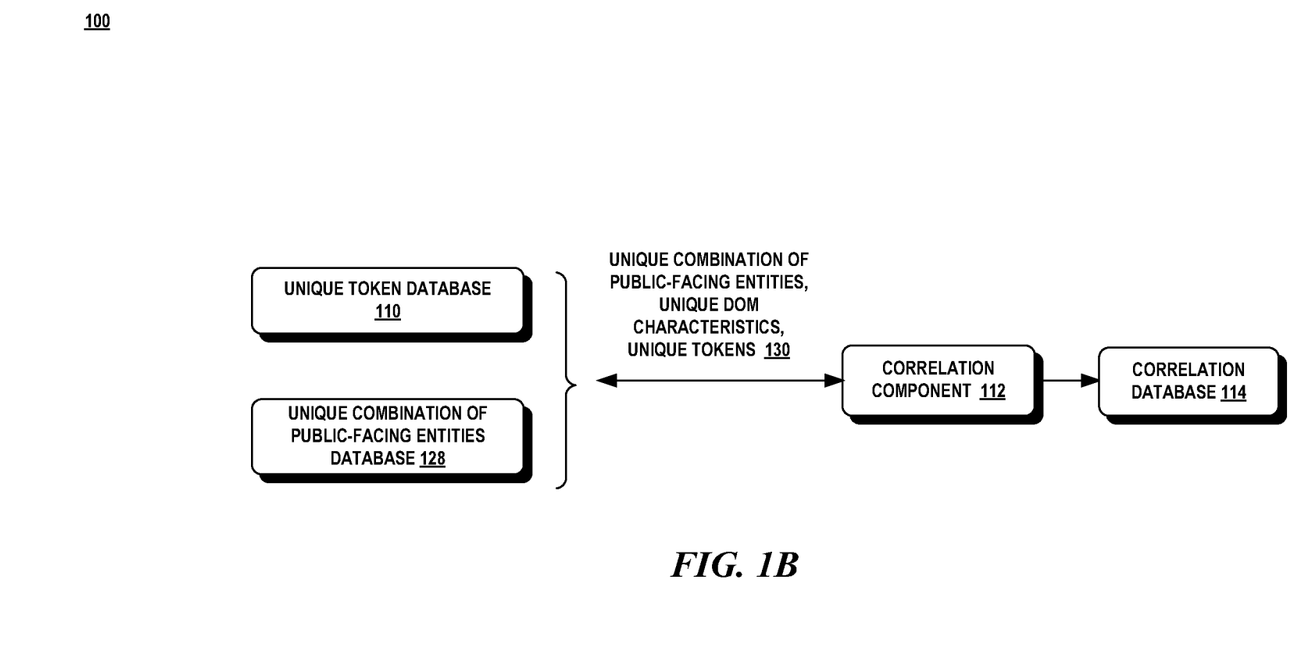

FIGS. 1A-1B illustrate an exemplary system 100 in which various aspects of the invention may be practiced. A static analysis component 102 performs a static analysis of the source code files in one or more source code repositories 104A-104N ("104") to find fingerprints, such as unique tokens, in each source code file of a source code repository and the combination of public-facing entities of a source code repository 116. The static analysis component 102 analyzes source code files written in a programming language, a text-based markup language (e.g., HTML/Extensible Markup Language (XML)), scripting language (e.g., JavaScript), Cascading Style Sheet (CSS) files, configuration files, and so forth. The unique tokens found by the static analysis component 102 include unique static values and attribute-value pairs 120.

A dynamic analysis component 106 performs a dynamic analysis of the web content of a web endpoint 108A-108N ("108"). Dynamic analysis includes a combination of web crawling and webscraping since the content data of a web endpoint is rendered at runtime and differs from the static versions of the originating files. The dynamic content of a web endpoint includes Uniform Resource Locator (URL) patterns, JavaScript files, CSS files, web fonts, images, and downloadable public media 118. The unique tokens obtained from the dynamic content include string literals, file names, path names, DOM elements, and attribute-value pairs 122 which are stored in token database 110. In addition, the dynamic analysis component 106 identifies the unique combination of public-facing entities (e.g., libraries) 118 found at the web endpoint 108 which are stored in database 128.

A source code repository 104 is a file archive that hosts projects having source code files 116. The source code repository 104 may be private and internal to an organization, group, enterprise or user or may be publicly-accessible through the Internet. The source code repository 104 may include a version control system that manages changes made to the source code files. The source code repository 104 may be distributed or centralized. In a centralized source code repository, there is a single repository that contains all versions of the source code. There is one copy of the repository and a developer gets the latest copy of the source code from the centralized repository. Changes made by the developer are committed to the master copy in the centralized repository. In a distributed source code repository (e.g., GIT), each developer has their own local repository of the source code with the history and versions of the source code. The developer's changes are made to their local repository and then a set of changes is applied to the master repository.

In one aspect, a web endpoint 108 is accessed through one or more web Application Programming Interfaces (APIs), such as a Representational State Transfer (REST) APIs. A REST API is used to initiate a request to a web endpoint, where the request specifies an HTTP operation or method to be performed to create, retrieve, update or delete a resource of the web service. The request may include a request Uniform Resource Identifier (URI) and a HTTP request message header. The URI may indicate the protocol used to transmit the request (e.g., http, https), the domain name or Internet Protocol (IP) address of the server of the REST service endpoint, the resource path and parameters. The HTTP request message header includes a HTTP method (e.g., GET, HEAD, PUT, POST, and PATCH methods) that tells the web service the type of operation that is being requested. The response may include a HTTP response message header and a HTTP response message body. The HTTP response message header may include a status code and other optional data. The HTTP response message body includes the requested data.

A token is a value of an element of the source code. In one aspect, a token is a literal that has a fixed value or an attribute value. For example, in the following JavaScript code,

```
var instKey = "1111-22-33333-444444";
callToFunction("#input_form", "VC23-162b");
    the tokens are the strings, "1111-22-33333-444444", "#input_form",
and "VC23-162b", since they are fixed-valued literals.
```

In the following HTML code,

```
<div id ="main_screen_customer" class ="fullscreen"> ... </ div>
<script src="//mycdn.net/path/to/ibrary.js?v=3" > </script>
    the tokens are the attribute values, "main_screen_customer",
"fullscreen", and "mycdn.net/path/to/library.js?v=3".
```

A token may also be an attribute-value pair. In a webpage, some of the elements are HTML elements that contain a combination of attribute names and values. The values may not be unique but the combination of the attribute name and its value have a higher uniqueness. For this reason, a token includes attribute-value pairs which are a combination of an attribute name and its value. For example, for the following code snippet:

```
<img name ="title" rel ="mask-icon" src ="https://contoso.com" />,
    the tokens include the following attribute-value pairs: (1) name: "title",
(2) rel: "mask-icon", and (3) src: "https://contoso.com".
```

A unique token is a token that has a high degree of randomization and has a significant length that makes it appear less frequently. To determine uniqueness, a token is stored in a token database 110 along with its location. A count is used to track the frequency the token appears in a particular source. If token appears too often, it not considered a unique token and is deleted from the token database.

In one aspect, the token database 110 may include a token corpus file 124 and a token location file 126. The token corpus file 124 contains the source of the token, which is either a source code repository name or a URL of a web endpoint (e.g., REP01, URL1, REP02), and a token identifier for the token. The token location file 126 includes the token identifier (e.g., 1, 2, . . . ), the token, the source of the token (e.g., JavaScript (JS) literal, DOM attr, etc.), metadata (e.g., when the token was first found, when the token was last found), and the count, which is the frequency that the token is discovered in a particular source.

Turning to FIG. 1B, a correlation component 112 scans the token database 110 and the unique combination of public-facing entities database 128 to obtain the fingerprints which are the unique combination of public-facing entities, the unique DOM characteristics, and the unique tokens 130 used to compute a correlation coefficient that represents the likelihood that a particular web endpoint and source code repository are related. The correlation coefficients of a respective source code repository and web endpoint are stored in a coefficient database 114.

It should be noted that FIGS. 1A-1B show components of the system in one aspect of an environment in which various aspects of the invention may be practiced. However, the exact configuration of the components shown in FIGS. 1A-1B may not be required to practice the various aspects and variations in the configuration shown in FIGS. 1A-1B and the type of components may be made without departing from the spirit or scope of the invention.

Figure 2A:
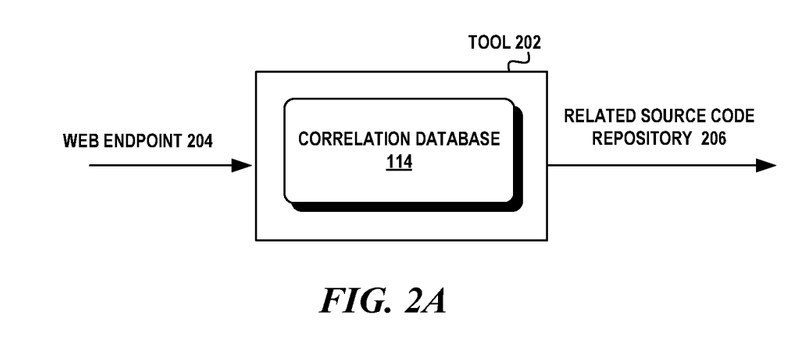
FIGS. 2A-2B are block diagrams illustrating exemplary scenarios for utilizing the correlation coefficients.
Figure 2B:
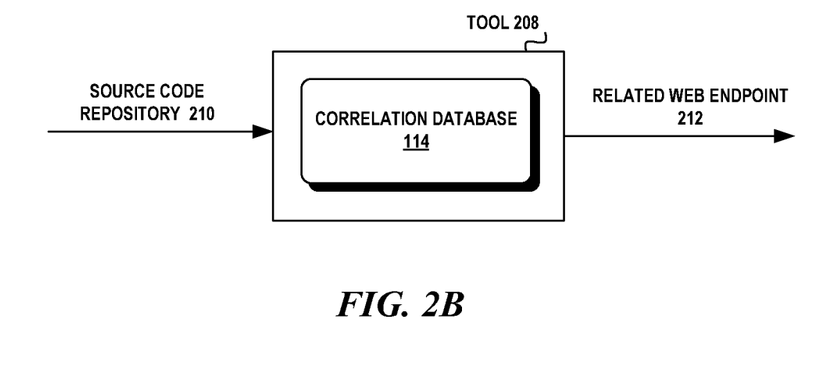

Turning to FIGS. 2A and 2B, the coefficient database 114 may be used in a tool 202 (e.g., software component, plug-in, add-in, etc.) to predict the source code repository that is related 206 to a web endpoint 204 by virtue of the fingerprints common to both the repository 206 and the web endpoint 204. Additionally, the coefficient database 114 may be used in a tool 208 to predict the web endpoint 212 related to a source code repository 210 by virtue of the web endpoint 212 exposing fingerprints originating from the repository 210. In one aspect, the tool may be part of an Integrated Development Environment. In other aspects, the tool may be integrated with a source code repository and used to track back snippets of source code or source code files to its original libraries or renaming libraries.

Methods.

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 3A:
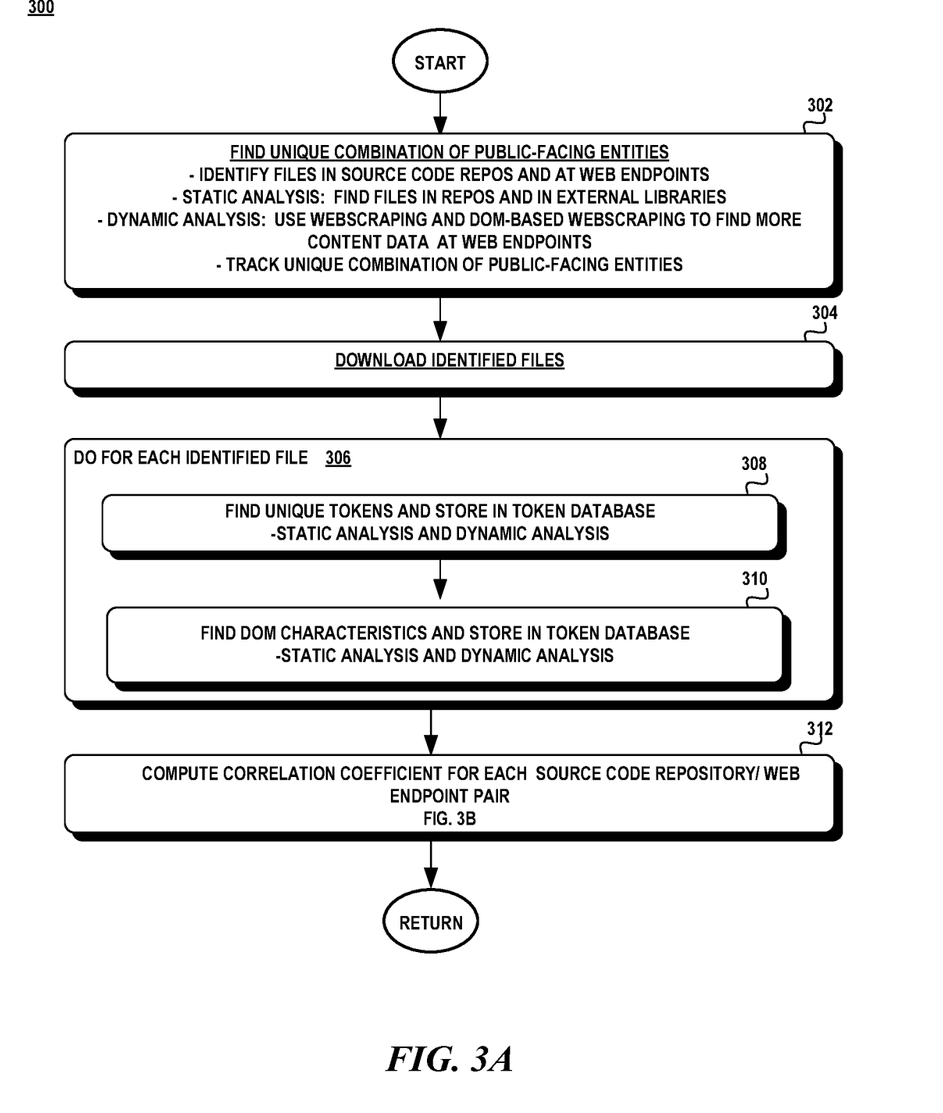
FIGS. 3A-3B are flow diagrams illustrating an exemplary method for analyzing source code repositories and web endpoints for fingerprints and to compute a correlation coefficient for a source code repository and web endpoint pair based on the fingerprints.
Figure 3B:
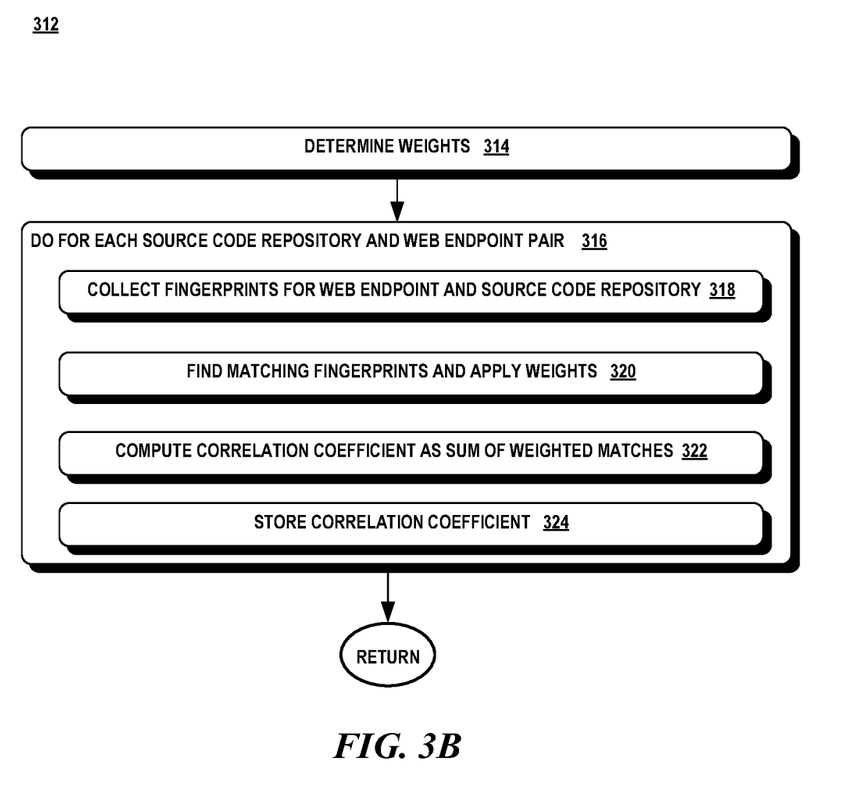

FIGS. 3A-3B illustrate an exemplary method 300 for discovering the relationship between a source code repository and a web endpoint.

Turning to FIG. 3A, initially, the unique combination of public-facing entities is discovered. The static component searches for files that contain source code used in web applications. The dynamic component searches for the content data of a web endpoint. In one or more aspects, the method is pre-configured with a set of web endpoints to analyze and a number of source code repositories to analyze. (Collectively, block 302)

In addition to the known source code repositories, the static component searches for external libraires or public-facing entities that are used in web applications. Web-based projects rely on a number of public-facing entities to provide client-side functionality and visual components which may be contained in JavaScript libraries, Cascade Style Sheet (CSS) files, web fonts, images and the like. The public-facing entities may be found in well-known open source libraries, such as React, Vue, JQuery, Google Analytics, etc. (Collectively, block 302).

The location of the public-facing entities may not be known. In this case, the static component may search package managers associated with a web application framework to find these external libraries. A web application framework is a collection of resources that support the development of web applications, web APIs, and web services. A web application framework may include a package manager that automates the process of installing, upgrading, configuring, and removing computer programs for a computer's operating system in a consistent manner The package managers include libraries having source code used for web application development. (Collectively, block 302).

The dynamic component analyzes the content data of a web endpoint. To find the content data of a web endpoint, webscraping techniques are used. Classic webscraping involves fetching a web page from a website and then extracting from it content and additional web pages. Web pages are constructed from text-based markup languages, such as HTML, XML and Extensible HyperText Markup Language (XHTML), and contain content data in text form which can be readily extracted from the web page. Hyperlinks and references to external-facing entities can be extracted from the markup language files. (Collectively, block 302)

At some web endpoints, single page applications are used which rely on JavaScript and API calls to form the content of a web page dynamically thereby rendering additional files and libraries. These files and libraries would not be detected from classic webscraping. In this scenario, DOM-based scraping is used to find these external-facing entities (e.g., JavaScript file and libraries) and to follow hyperlinks. DOM-based scraping builds the DOM and executes the scripts located in the HTML source code. Data is then extracted from the DOM with selectors. DOM-based scraping is performed using a headless browser. (Collectively, block 302).

The files in these external libraries and the files in the source code repository are downloaded for further analysis by the static component and the content data of the web endpoints are downloaded as well. The unique combination of the files of a source code repository and web endpoint are stored in a database for further analysis. (Collectively, block 304).

Each of the downloaded files are then analyzed for unique tokens and DOM characteristics. The static component analyzes the static files, such as the source code files from a source code repository and the dynamic component analyzes the DOM elements in the DOM of a rendered web page. The DOM is a data representation of the objects that comprise the structure and content of a web page. The DOM is modified with a scripting language, such as JavaScript. (Collectively, block 306).

The static component may parse the source code file into a parse tree or abstract syntax tree to extract the literals in the source code file that represent static values. The dynamic component analyzes the DOM of a rendered web page to identify attribute-value pairs from the DOM elements of the web page. (Collectively, block 308).

The unique tokens are then stored in the token database. In one aspect, the token database is composed of a token corpus segment and a token location segment. The token corpus segment identifies the location of a token and an identifier for the token. The token location segment includes the token identifier, the token, the token type, the token's metadata, and the count of the number of times the token is found. (Collectively, block 310).

After all the identified files are mined, the correlation component computes a correlation coefficient for each source code repository and web endpoint pair which is stored in the correlation database (block 312).

Referring to FIG. 3B, in one aspect, the correlation coefficient is computed as a weighted sum of matched fingerprints. The weights are configured initially to accommodate a target goal. In one aspect, the weights are used to give importance to certain fingerprints over other fingerprints. For example, unique tokens are given a higher weight since they are more unique than the combination of publicly-facing entities. The weight of a token may represent the uniqueness of the token. In one aspect, the weight of a token may be the ratio of the size of the token corpus over the frequency of the token. In this manner, a higher weight is given to a token that occurs less frequently and deemed very unique. (Collectively, block 314).

The correlation component computes a correlation coefficient for each source code repository and web endpoint pair (block 316). Initially, the fingerprints for the web endpoint and source code repository of the pair are collected (block 318).

The correlation component looks for matches between the fingerprints of a web endpoint and a source code repository. For tokens, a match is when the value of the one token is identical to the value of another token. For a public-facing entity, a match is when the same library is found in both fingerprints and the version of a matched library is at least the same version or more recent as the other matched library. For each matched fingerprint, a respective weight is applied to the match. (Collectively, block 320).

The correlation component then computes the correlation coefficient for the source code repository and web endpoint pair as the sum of the weights of each matched fingerprint. In one aspect, the correlation coefficient is interpreted as a high value when the correlation coefficient exceeds a threshold value and is a low value when the correlation coefficient is less than the threshold value. A high value indicates that the source code repository and web endpoint are related. (Collectively, block 322).

For example, consider the source code repository, REPO, and web endpoint, EP. The fingerprints for REPO are listed in the vector, REPO=[L0:v1, L1:v1, L2:v1, L3:v2, T0, T2, D:[d1,d2]] and the fingerprints for EP are listed in the vector EP=[L0:v1, L1:v1, L2:v2, T0, T1, T2, D:[d1,d2,d3]]. The fingerprints for REPO include version v1 of library L0, version v1 of library L1, version v1 of library L2, version v2 of library L3, tokens T0, T2, and DOM attribute-value pairs, d1 and d2. The fingerprints for EP include version v1 of library L0, version v1 for library L1, version v2 of library L2, tokens T0, T1, T2, and DOM attribute-value pairs, d1, d2 and d3.

In this example, there are 7 matches which are as follows:
Match1={REPO, EP, L0} (REPO and EP share the same library since they both use the same version of library L0),
Match2={REPO, EP, L1} (REPO and EP share the same library since they both use the same version of library L1),
Match3={REPO, EP, L2} (REPO uses an older version of library L2 and EP uses a newer version of library L2 which is considered a match),
Match4={REPO, EP, T0} (REPO and EP both share the token T0),
Match5={REPO, EP, T2} (REPO and EP both share the token T2),
Match6={REPO, EP, d1} (REPO and EP both share the DOM attribute-value pair d1), and
Match7={REPO, EP, d2} (REPO and EP both share the DOM attribute-value pair d2).

The correlation coefficient, CC, for REPO, EP is the following sum of the weights of each match:
CC=(Match1*1)+(Match2*1)+(Match3*1)+ (Match4*Weight1)+(Match5*Weight2)+ (Match6*Weight3)+(Match7*Weight4). The value of each match, Match1, Match2, Match3, . . . Match7, is one.

Figure 4A:
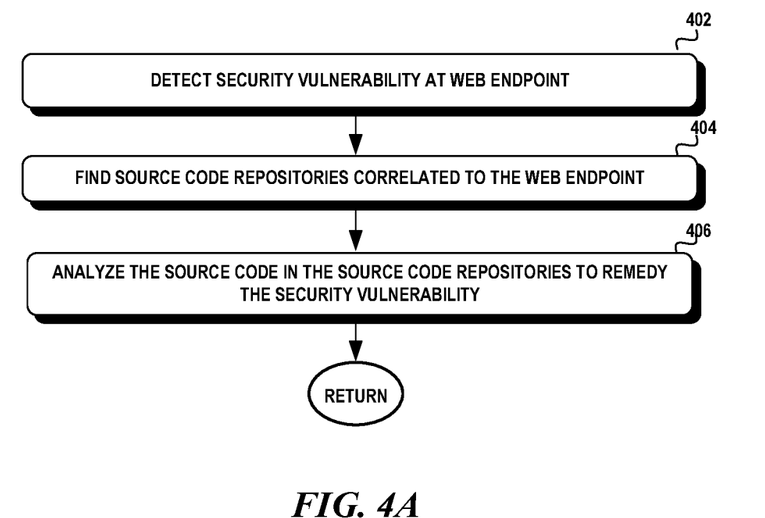
FIGS. 4A and 4B are flow diagrams illustrating exemplary methods for utilizing the correlation coefficients.
Figure 4B:
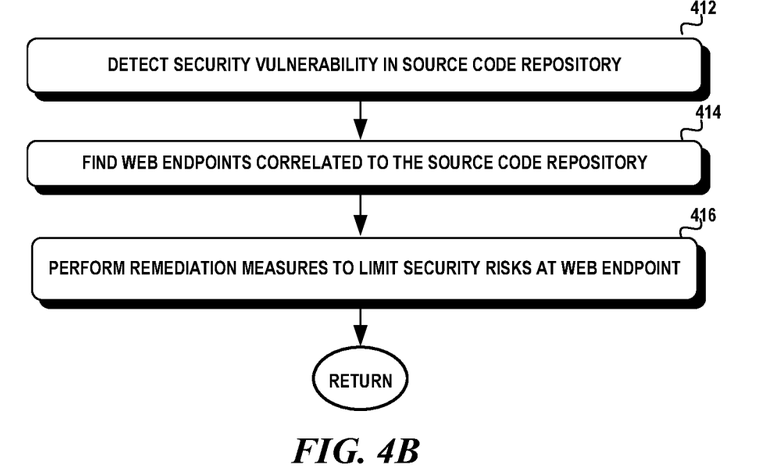

Attention now turns to the application of the correlation coefficients. Turning to FIGS. 4A and 4B, in one aspect, the correlation database may be used in a security service to detect the source of a security vulnerability or to detect the outcome of a security vulnerability. A security vulnerability may be detected using a security analysis tool. For example, web vulnerabilities may be found using Static Analysis Security Testing (SAST) or Dynamic Analysis Security Testing (DAST). SAST is a testing methodology that analyzes source code before it is compiled to detect potential security vulnerabilities. DAST is a testing methodology that finds potential security vulnerabilities in web applications while running in production mode.

Upon detection of a security vulnerability at a web endpoint (block 402), the correlation database is used to locate the source code repositories having a high correlation coefficient with a web endpoint (block 404) in order to analyze the source of the security vulnerability in the identified source code repositories (block 406).

Upon detection of a security vulnerability in source code of a source code repository (block 412), the correlation database is used to find web endpoints having a high correlation coefficient with the source code repository (block 414), in order to perform remediation measures to limit the security risks at the web endpoint (block 416).

Exemplary Operating Environment

Figure 5:
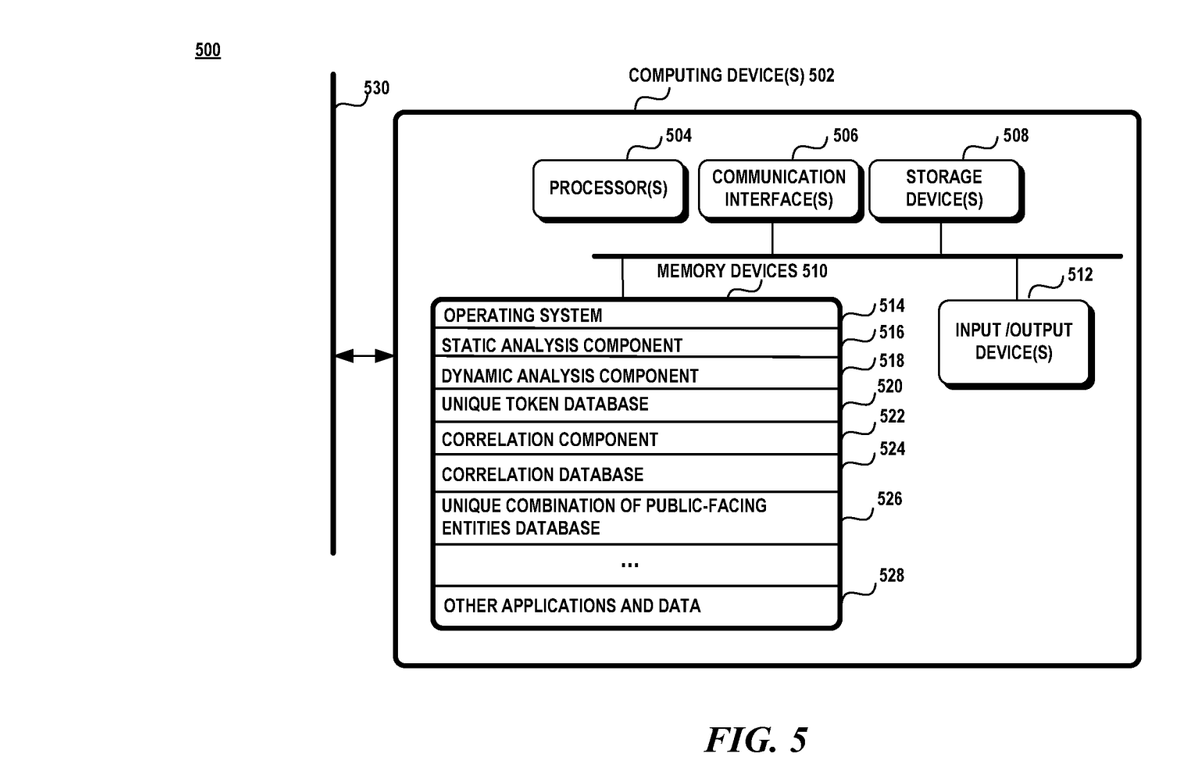
FIG. 5 is a block diagram illustrating an exemplary operating environment.

Attention now turns to a discussion of an exemplary operating environment. FIG. 5 illustrates an exemplary operating environment 500 having one or more computing devices 502 used to find a correlation between a source code repository and a web endpoint. However, it should be noted that the aspects disclosed herein is not constrained to any particular configuration of devices. It should be noted that the operating environment is not limited to any particular configuration and other configurations are possible.

A computing device 502 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, an Internet-of-Things (IOT) device, a distributed computing system, multiprocessor systems, or combination thereof. The operating environment 500 may be configured in a network environment, a distributed environment, a multi-processor environment, or as a combination of one or more stand-alone computing devices having access to remote or local storage devices.

A computing device 502 may include one or more processors 504, one or more communication interfaces 506, one or more storage devices 508, one or more input/output devices 512, and one or more memory devices 510. A processor 504 may be any commercially available central processing unit (CPU), microprocessor, processor core, or customized processor and may include dual microprocessors and multi-processor architectures. The communication interface 506 facilitates wired or wireless communications between the computing device 502 and other devices. A storage device 508 may be computer-readable medium that does not contain propagating signals, such as modulated data signals transmitted through a carrier wave. Examples of a storage device 508 include without limitation Random Access Memory (RAM), Read Only Memory (ROM), Electrically Erasable Programmable Read Only Memory (EEPROM), flash memory or other memory technology, Compact Disc Read Only Memory (CD-ROM), digital versatile disks (DVD), or other optical storage, magnetic cassettes, magnetic tape, magnetic disk storage, all of which do not contain propagating signals, such as modulated data signals transmitted through a carrier wave. There may be multiple storage devices 508 in the computing device 502. The input/output devices 512 may include a keyboard, mouse, pen, voice input device, touch input device, display, speakers, printers, etc., and any combination thereof.

A memory 510 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory 510 may also include one or more external storage devices or remotely located storage devices that do not pertain to propagated signals, such as modulated data signals transmitted through a carrier wave. The memory 510 may include an operating system 514, a static analysis component 516, a dynamic analysis component 518, a unique token database 520, a correlation component 522, a correlation database 524, a unique combination of public-facing entities database 526, and other applications and data 528.

The computing device 502 may be communicatively coupled to a network 530. The network 530 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, portions of the Public Switched Telephone Network (PSTN), plain old telephone service (POTS) network, a wireless network, a WiFi® network, or any other type of network or combination of networks.

The network 530 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Conclusion

A system is disclosed comprising: one or more processors; a memory; and one or more programs, wherein the one or more programs are stored in the memory and are configured to be executed by the one or more processors, the one or more programs including instructions that: find fingerprints of a source code repository, wherein the fingerprints of the source code repository include at least one of a unique combination of public-facing entities of the source code repository, unique tokens of the source code repository, or unique Document Object Model (DOM) characteristics of the source code repository; find fingerprints of a web endpoint, wherein the fingerprints of the web endpoint include at least one of a unique combination of public-facing entities of the web endpoint, unique tokens of the web endpoint, or unique DOM characteristics of the web endpoint; relate, the source code repository with the web endpoint and/or the web endpoint with the source code repository, upon a high correlation detected between the fingerprints of the source code repository and the fingerprints of the web endpoint; upon detection of a security vulnerability with the web endpoint, identify the related source code repository; and upon detection of a security vulnerability with the source code repository, identify the related web endpoint.

In one aspect, the one or more programs include further instructions that: identify the unique combination of public-facing entities of the web endpoint through DOM webscraping. In one aspect, the one or more programs include further instructions that: identify the unique combination of public-facing entities of the source code repository through package managers. In one or more aspects, the unique tokens of the source code repository include static values of source code files of the source code repository and the unique tokens of the web endpoint include attribute-value pairs of a rendered web page.

In an aspect, the one or more programs include further instructions that: apply a weight to each fingerprint of the web endpoint and to each fingerprint of the source code repository; and identify a relationship between the source code repository and the web endpoint based on a weighted sum of fingerprints of the source code repository that match fingerprints of the web endpoint. In an aspect, the weight of a unique token of the source code repository and a unique token of the web endpoint is based on frequency of occurrence of a value of the unique token.

A method is disclosed that is performed on a computing device having a processor and a memory. The method comprising: identifying a relationship between a web endpoint and a source code repository based on fingerprints of the source code repository matching fingerprints of the web endpoint, wherein the fingerprints of the source code repository include unique tokens found in source code files of the source code repository, wherein the fingerprints of the web endpoint include unique tokens found in dynamic content of the web endpoint; upon detection of a security vulnerability with the source code repository, obtaining the related web endpoint for analysis of the security vulnerability with the related web endpoint; and upon detection of a security vulnerability with the web endpoint, obtaining the related source code repository for analysis of the security vulnerability with the related source code repository.

In an aspect, the fingerprints of the source code repository include unique combinations of publicly-facing entities of the source code repository, wherein the fingerprints of the web endpoint include unique combinations of public-facing entities of the web endpoint. In an aspect, the dynamic content of the web endpoint includes attribute-value pairs of a rendered web page of the web endpoint.

In one or more aspects, the method further comprises applying a weight to each unique token of the source code repository and each unique token of the web endpoint; computing a correlation coefficient based on unique tokens of the source code repository matching unique tokens of the web endpoint; and relating the web endpoint to the source code repository based on the correlation coefficient. In one or more aspects, the method further comprises generating the weight of each unique token based on a frequency of occurrence of a unique token.

In an aspect, the method further comprises applying a weight to each fingerprint of the source code repository and to each fingerprint of the web endpoint; and establishing a relationship between the web endpoint and the source code repository based on a weighted sum of matched fingerprints. In an aspect, the method further comprises: matching a combination of publicly-facing entities based on a version of a publicly-facing entity of the source code repository matching a same or later version of a same publicly-facing entity of the web endpoint. In an aspect, the unique tokens of the source code repository are static values, wherein the unique tokens of the web endpoint are attribute-value pairs of a Document Object Model (DOM) element.

A device is disclosed comprising: a processor coupled to a memory; wherein the processor is configured to execute instructions stored in the memory that perform acts that: aggregate unique tokens found in source code files of a source code repository and unique tokens found in content of a web endpoint; compute a correlation coefficient for the source code repository and the web endpoint, wherein a high correlation coefficient represents an association between the source code repository and the web endpoint, wherein the correlation coefficient is based on a number of matches between the unique tokens of the source code repository and the unique tokens of the web endpoint; and upon detection of a security vulnerability with the source code repository or the web endpoint, use the correlation coefficient of the source code repository or the web endpoint to find a related source code repository or related web endpoint.

In an aspect, the processor is configured to execute instructions stored in the memory to perform acts that: aggregate public-facing entities of the source code files of the source code repository and public-facing entities of the web endpoint; and wherein the computation of the correlation coefficient is based further on a number of matches of the public-facing entities of the source code repository with the public-facing entities of the web endpoint.

In an aspect, the processor is configured to execute instructions stored in the memory to perform acts that: aggregate attribute-value pairs from Document Object Model (DOM) elements of a rendered web page of the web endpoint and attribute-values pairs of DOM elements of a source code repository; and wherein the computation of the correlation coefficient is based further on a number of matches of the attribute-value pairs of a web endpoint with the attribute-value pairs of the source code repository.

In an aspect, the processor is configured to execute instructions stored in the memory to perform acts that: apply a weight to each unique token; and wherein the computation of the correlation coefficient is a weighted sum of the matches between the unique tokens of the source code repository and the unique tokens of the web endpoint. The processor is further configured to execute instructions stored in the memory to perform acts that: apply a weight to each public-facing entity; and wherein the computation of the correlation coefficient is a weighted sum of the matches between the unique tokens of the source code repository and the unique tokens of the web endpoint and matches between the unique combination of public-facing entities of the source code repository and the public-facing entities of the web endpoint.

While this specification contains many specific implementation details, these should not be construed as limitations on the scope of what may be claimed, but rather as descriptions of features that may be specific to particular implementations. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the combination may be directed to a sub-combination or variation of a sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
one or more processors; a memory; and
one or more programs, wherein the one or more programs are stored in the memory and are configured to be executed by the one or more processors, the one or more programs including instructions that:
find fingerprints of a source code repository, wherein the fingerprints of the source code repository comprise at least one of unique combination of public-facing entities of the source code repository, unique tokens of the source code repository, or unique Document Object Model (DOM) characteristics of the source code repository, wherein the fingerprints of the source code repository are based on an aggregation of fingerprints of each source code file of the source code repository;
find fingerprints of a web endpoint, wherein the fingerprints of the web endpoint comprise at least one of unique combination of public-facing entities of the web endpoint, unique tokens of the web endpoint, or unique DOM characteristics of the web endpoint;
relate, the source code repository with the web endpoint and/or the web endpoint with the source code repository, based on a similarity between the fingerprints of the source code repository and the fingerprints of the web endpoint;
upon detection of a security vulnerability with the web endpoint, identify the related source code repository; and
upon detection of a security vulnerability with the source code repository, identify the related web endpoint.

2. The system of claim 1, wherein the one or more programs include further instructions that:
identity the unique combination of public-facing entities of the web endpoint through DOM webscraping.

3. The system of claim 1, wherein the one or more programs include further instructions that:
identify the unique combination of public-facing entities of the source code repository through package managers.

4. The system of claim 1, wherein the unique tokens of the source code repository comprise static values of source code files of the source code repository.

5. The system of claim 1, wherein the unique tokens of the web endpoint comprise attribute-value pairs of a rendered web page.

6. The system of claim 1, wherein the one or more programs include further instructions that:
apply a weight to each fingerprint of the web endpoint and to each fingerprint of the source code repository; and
identify a relationship between the source code repository and the web endpoint based on a weighted sum of fingerprints of the source code repository that match fingerprints of the web endpoint.

7. The system of claim 6, wherein the weight of a unique token of the source code repository and a unique token of the web endpoint is based on frequency of occurrence of a value of the unique token.

8. A method, performed on a computing device having a processor and a memory, the method comprising:
identifying a relationship between a web endpoint and a source code repository based on fingerprints of the source code repository matching fingerprints of the web endpoint, wherein the fingerprints of the source code repository comprise unique tokens found in an aggregation of source code files of the source code repository, wherein the fingerprints of the web endpoint comprise unique tokens found in dynamic content of the web endpoint;
upon detection of a security vulnerability with the source code repository, obtaining the related web endpoint for analysis of the security vulnerability with the related web endpoint; and
upon detection of a security vulnerability with the web endpoint, obtaining the related source code repository for analysis of the security vulnerability with the related source code repository.

9. The method of claim 8, wherein the fingerprints of the source code repository include comprise unique combinations of publicly-facing entities of the source code repository, wherein the fingerprints of the web endpoint include unique combinations of public-facing entities of the web endpoint.

10. The method of claim 9, further comprising:
applying a weight to each fingerprint of the source code repository and to each fingerprint of the web endpoint; and
establishing a relationship between the web endpoint and the source code repository based on a weighted sum of the weights of the matched fingerprints.

11. The method of claim 9, further comprising:
matching a combination of publicly-facing entities based on a version of a publicly-facing entity of the source code repository matching a same or later version of a same publicly-facing entity of the web endpoint.

12. The method of claim 8, wherein the dynamic content of the web endpoint includes attribute-value pairs of a rendered web page of the web endpoint.

13. The method of claim 8, further comprising:
applying a weight to each unique token of the source code repository and each unique token of the web endpoint;
computing a correlation coefficient based on unique tokens of the source code repository matching unique tokens of the web endpoint; and
relating the web endpoint to the source code repository based on the correlation coefficient.

14. The method of claim 13, further comprising:
generating the weight of each unique token based on a frequency of occurrence of a unique token.

15. The method of claim 8, wherein the unique tokens of the source code repository are static values, wherein the unique tokens of the web endpoint are attribute-value pairs of a Document Object Model (DOM) element.

16. A device, comprising:
a processor; and
a memory coupled to the processor;
wherein the processor is configured to execute instructions stored in the memory that perform acts that:
aggregate unique tokens found in each source code file of a source code repository and unique tokens found in content of a web endpoint;
compute a correlation coefficient for the source code repository and the web endpoint, wherein a high correlation coefficient represents an association between the source code repository and the web endpoint, wherein the correlation coefficient is based on a number of matches between the unique tokens of the source code repository and the unique tokens of the web endpoint; and
upon detection of a security vulnerability with the source code repository or the web endpoint, use the correlation coefficient of the source code repository or the web endpoint to find a related source code repository or related web endpoint.

17. The device of claim 16, wherein the processor is configured to execute instructions stored in the memory to perform acts that:
aggregate public-facing entities of the source code files of the source code repository and public-facing entities of the web endpoint; and
wherein the computation of the correlation coefficient is based further on a number of matches of the public-facing entities of the source code repository with the public-facing entities of the web endpoint.

18. The device of claim 17, wherein the processor is configured to execute instructions stored in the memory to perform acts that:
apply a weight to each public-facing entity; and
wherein the computation of the correlation coefficient is a weighted sum of the matches between the unique tokens of the source code repository and the unique tokens of the web endpoint and matches between the unique combination of public-facing entities of the source code repository and the public-facing entities of the web endpoint.

19. The device of claim 16, wherein the processor is configured to execute instructions stored in the memory to perform acts that:
- aggregate attribute-value pairs from Document Object Model (DOM) elements of a rendered web page of the web endpoint and attribute-values pairs of DOM elements of a source code repository; and
- wherein the computation of the correlation coefficient is based further on a number of matches of the attribute-value pairs of a web endpoint with the attribute-value pairs of the source code repository.

20. The device of claim 16, wherein the processor is configured to execute instructions stored in the memory to perform acts that:
- apply a weight to each unique token; and
- wherein the computation of the correlation coefficient is a weighted sum of the matches between the unique tokens of the source code repository and the unique tokens of the web endpoint.

* * * * *